July 6, 1965 M. WEISS 3,193,682
NARROW WAVELENGTH RANGE HORIZON SENSORS
Filed Oct. 12, 1962
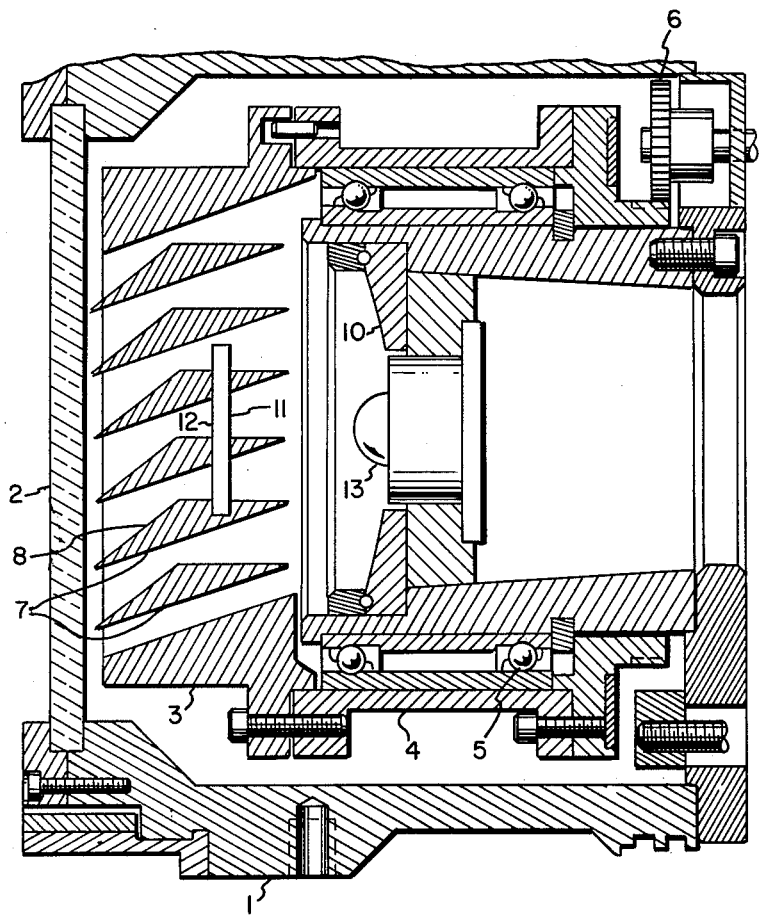
INVENTOR.
MORRIS WEISS
BY
*ATTORNEY*

United States Patent Office 3,193,682
Patented July 6, 1965

3,193,682
NARROW WAVELENGTH RANGE HORIZON
SENSORS
Morris Weiss, Stamford, Conn., assignor to Barnes Engineering Company, Stamford, Conn., a corporation of Delaware
Filed Oct. 12, 1962, Ser. No. 230,130
8 Claims. (Cl. 250—83.3)

This invention relates to improved horizon sensors, particularly those of the conical scan type.

Horizon sensors have been extensively used for determining departures from a predetermined attitude in various space vehicles such as rockets, Mercury capsules and the like. One of the most successful horizon sensors is described in the Merlen Patent 3,020,407, February 6, 1962. This horizon sensor is of the conical scan type, a rotating germanium prism producing the conical scan and being detected by a germanium immersed thermistor bolometer. The electronic circuits include a reference pulse generator at predetermined points on the scan which usually represent a vertical axis of the vehicle. The electrical signal is then processed and the rotational times from horizon crossing to reference signal and then to the next horizon crossing are compared and from this information it is determined whether the vehicle is in its desired attitude or otherwise an error signal is produced. The electronic and other processing of horizon sensor signals will not be further discussed as the present invention does not in any way change the nature of the electronic processing. It deals with improvements in the optical portion of the instrument involved in the scan. Electrical processing circuits are just as necessary with the horizon sensor of the present invention but they are not changed over what is known before by the new optical arrangement.

In spite of the practical success of the horizon sensor as described in the Merlen patent certain problems have arisen which make a modified and improved optical setup desirable. These problems will be discussed briefly so that the improvements made possible by the present invention can be fitted into the general horizon sensor picture.

Two problems are of particular significance. One is the effect of earth temperature and occurrences within the earth's atmosphere. The second is the problem presented by the sun which sometimes appears in the scan through space. The first problem is typified by the presence of very cold clouds or by scan across the cold ice and snow of polar regions. If the response of the electronic processing circuits are such that they count the signal from a cold cloud as part of the earth's scan a false reading can result. It is, of course, possible, to limit the threshold of signal to a value such that it is below that of a cold cloud but this presents problems to which certain electronic solutions have been found. The present invention deals with an improved optical solution.

In the copending application of Kaufman, Serial No. 63,623 filed October 19, 1960, now Patent No. 3,118,063 issued January 14, 1964, there is described a horizon sensor which operates from the narrow band of infrared corresponding to the emission of carbon dioxide in the vicinity of $15\mu$. This solves the cloud problem very simply and completely but it brings with it an energy problem. The standard rotating germanium prism transmits only a portion of the radiation, there being serious losses, and the small amount of energy available may not be sufficient to give as high a signal to noise ratio as is desirable for most reliable operations.

A second problem is presented when the sun is received during a scan of space. The sun signal can be rejected by various electronic means, for example, such as those described in the Merlen patent and others which are even more effective. However, the intensity of the sun's radiation, even with germanium optics, is such that it places a severe strain on the capacity of the electronic circuits and can easily result in overloading or distortion.

The present invention solves the problems presented above by an all reflective system with a reflective cutoff filter of extremely high efficiency which removes short wave radiation, passing radiation from $14\mu$ on. The reflective filter is one which reflects certain long waves totally producing what is referred to in optics as residual reflected rays or frequently referred to by their German name "reststrahlen." The latter common designation will be used throughout the remainder of the specification and claims. A great many crystalline materials exhibit the phenomena of reststrahlen at different wavelengths. Typical materials which have a short wave cutoff at a suitable point are lithium fluoride and magnesium oxide. Because of the ease of which lithium fluoride can be made into mirrors and polished it presents some mechanical advantages over magnesium oxide.

The best range of radiation for discriminating against cold clouds is from about 14 to $16\mu$ which is centered on the carbon dioxide emission band. If much shorter wavelengths are included the difference between earth radiation through a clear sky and cold clouds increases very rapidly and will produce cloud interferences. It is, therefore, not desirable to go any considerable distance below $14.5\mu$ although it is still possible to get acceptable results with a range of about 14 to 16. Longer wavelengths do not result in a difference between earth radiation and cold cloud which increases so precipitously as when wavelengths substantially below $14.5\mu$ are included. Even with a range of from about 14.5 to $35\mu$ the results are only a little inferior to the best band. The reason for the slow change on the longer wavelength side is that as the band is broadened there is a gain in signal energy and this is only slowly counterbalanced by increased difference between earth and cloud radiation. Therefore, the two ranges of wavelengths last referred to are sufficiently good so that they are useful and, therefore, constitute usable second best ranges to the best range of about 14.5 to $15.5\mu$. These second best ranges are, therefore, included in the broader aspects of the present invention.

When it is desired to utilize radiations in the 14 to $18\mu$ band a filter is needed which cuts off infrared radiation approximately at $18\mu$. This filter may be of any suitable type, for example, it could consist in the use of a germanium immersed bolometer as radiation detector. However, even in the range from 14 to $18\mu$ there is some loss of radiation as germanium optics are not perfect transmitters. In such a case a silicon immersed bolometer may be used with a more efficient filter. A higher signal to noise ratio thereby becomes possible and the reliability of the horizon sensor is somewhat increased. Therefore, in the present invention all reflective scanning optics are desirable and constitute the preferred modification. The reference to all reflective optics in the scanning portion of the instrument should be understood as relating to this portion only. The detector itself will ordinarily be a thermal detector such as a thermocouple or a thermistor immersed on a germanium or silicon lens. The refractive optics are in this portion of the instrument, however, not in the scanner itself. The immersed detector may be provided with a suitable antireflection coating peaked at about 15 or $16\mu$ and a great increase in sensitivity is obtained over an unimmersed detector in spite of the fact that the immersion lens does not transmit 100% of the long wave radiation involved. As the present invention does not change significantly the nature of the detector this portion of the instrument will not be further discussed except for a brief reference to its existence in the specific description of the drawing.

It should be understood that in the preferred modification of the present invention which uses reflective scanning optics these optics are only included in combination with the reststrahlen filter which forms the new element in the optical combination.

The broad idea of reflective scanning optics in a horizon sensor is not new. One form is described in the copending application of Astheimer and Peterssen, Serial No. 195,185 filed May 16, 1962, and an even more elaborate and effective modification is described and claimed in the copending application of Farmer, Serial No. 230,145 filed October 12, 1962. It is an advantage of the present invention that it is not limited to any particular type of reflective scanning optics except insofar that the optics must permit the mounting of a suitable reststrahlen reflective filter. This added flexibility is an advantage of the present invention.

The reststrahlen filter of lithium fluoride, magnesium oxide or the like may be sufficiently thick so that all of the radiation shorter than about $14\mu$ is absorbed. However, sometimes it is desirable from consideration of weight and space to use a somewhat thinner mirror which would let short wave radiations pass through. In certain constructions there transmitted rays will leave the instrument and create no problem. In other constructions it is desirable to provide for their absorption and this can easily be effected by coating the rear of the reststrahlen mirror with an absorbing layer, for example, a black layer which absorbs strongly in the visible and short wave infrared. Therefore, reference in the specification and in the claims to a reststrahlen mirror capable of absorbing a shorter wavelength is intended to include either a mirror sufficiently thick to effect this result in the mirror thickness or a mirror with an absorbing backing. From the standpoint of the operation of the present invention it makes absolutely no difference how the short wave radiation is absorbed. Putting it another way the detector and the rest of the horizon sensor cannot distinguish whether the short wave radiation absorption is effected in a thick reststrahlen mirror or in a thin mirror with an absorbent backing.

It should be noted that the problem presented by the excessive radiation level of the sun is also solved, or at least made more easily soluble, by the present invention. The vast majority of the energy in sunlight is shorter than about $14\mu$ but, of course, the sun does radiate in the longer wavelength infrared and in fact this signal will actually be somewhat higher than that from carbon dioxide emission or from a cold cloud or the earth. However, the difference between the energy level of the sun's signal in the long wave infrared and that of the earth or a cold cloud are so enormously reduced that no problem of overloading of the electronic sun rejection circuits is presented. Therefore, the present invention performs two functions with a single reststrahlen filter, one is the elimination of spurious signals resulting from cold clouds or other phenomena on the earth and at the same time without any additional elements the intensity of the sun's radiation is so greatly reduced that no problem is created in eliminating it electronically. This is an important advantage of the present invention as both functions are performed by the same elements and do not require any additional elements except, of course, the electronic circuits which are there in any event in any horizon sensor.

Another important advantage of the present invention is that it will eliminate spurious signals due to scanning across the moon in the event that the moon is encountered in the space scan. Radiation from the moon is predominantly that of reflected sunlight and the vast majority of this radiation is in the same short wavelength as in the case of the sun itself. The reststrahlen mirror completely eliminates these short radiations and so frequently interference from the moon is eliminated without requiring special additional circuits. Even if this is not sufficient by itself to eliminate interference from the moon the energy from the moon is so enormously decreased that it can be handled very simply by electronic elimination.

Reference has been made to conical scanning. Scanners of this type have many advantages and are well suited for the present invention which, therefore, is in its preferred modification when incorporated with conically scanning optics. It should be understood, however, that the elimination of cold cloud problems and sun problems are quite markedly reduced because interference is encountered only when a cold cloud or the sun is very close to the horizon and so is included in the short arc through which the oscillatory scanning means moves. The present invention, therefore, solves a problem which does not occur quite as often with this type of scanner as with the conical scan type but when it does occur the improvement obtained by the present invention is just as marked. Oscillatory scanners which oscillate over a very large arc, of course, present practically as great a cloud and sun problem as do the conical scanning sensors and so are benefited by the present invention to a comparable degree. The fact that the present invention is a useful improvement with practically all types of scanners is an important practical advantage because its utility is, therefore, not limited to one particular design.

The invention will be described in greater detail in conjunction with the drawing in which a cross section through a horizon sensor scanning mechanism is shown.

The end of the horizon sensor casing enclosing the scanning mechanism is shown at 1. This is connected to the rest of the horizon sensor which carries the electronic circuits and other elements. As these are not changed by the present invention the rest of the horizon sensor is not shown. In the casing 1 is mounted a window 2. This may be of a suitable material which has adequate transmission in the long wave infrared. For many purposes a window of silicon presents advantages as this combines good transmission with a further great reduction in transmission of short wavelengths when the scanner encounters the sun. A barrel 3 is mounted on a framework 4 which rotates on a ball bearing 5 and is driven by a gear 6 from a motor (not shown). The barrel contains a series of mirrors 7 with triangular direct light baffles 8. These mirrors are arranged in the form described and claimed in the Farmer application referred to above and are shown as illustrating a typical reflective scanning system in which the present invention can be incorporated. Of course, the multiple mirror system is not claimed in the present invention and is illustrative only of one type of reflective scanning optics.

The rays reflected by the multiple mirrors 7 as they turn strike a focussing mirror 10 which produces a beam encountering the reststrahlen mirror 11 of lithium fluoride or magnesium oxide which has a black absorbent back 12. The reststrahlen reflected from the mirror 11 are imaged onto an immersed bolometer 13 which produces the signal that is processed in the sensor's electronic circuits. As in all sensors the rotating scanning head also produces a reference pulse but since this is not any different than the reference pulse generated in the horizon sensor of the Merlen patent it is not shown since the cross section of the drawing is at a point where the reference generator does not appear.

The efficiency of the reflective scanner is very much greater than the germanium prism of the Merlen patent which in the long wavelength region will often be under 10%. The reststrahlen mirror is, of course, very efficient in the wavelength range permitted by the reststrahlen. There is a slight energy loss due to obscuration by the mirror 11 but as this energy would be lost in any event due to the necessity of mounting the detector in a central opening in the mirror 10 the overall efficiency of the system is but little reduced if any.

The present invention, particularly when used with reflective optics, presents a number of advantages without significant drawbacks. There is usually sufficient energy available so that no serious problem of poor signal to noise ratio is encountered. In addition to the almost perfect optical solution to the problems of cold clouds there is obtained a further advantage that the vast majority of energy in the direct radiations from the sun is eliminated. This greatly simplifies the problem of rejecting the sun when a sensor sees it in the space portion of its scan.

While the system is markedly more efficient than a sensor using a rotating prism as a scanning means it is desirable to obtain as much signal as possible and so an immersed bolometer 13 will ordinarily be used with anti-reflection coating at the wavelength of about 15μ. The coating is, of course, microscopically thin and so does not show on the drawing.

I claim:

1. In a horizon sensor including means for scanning across the horizon and an infrared detector the improvement which comprises a reststrahlen mirror absorbing wavelength shorter than about 14μ and reflecting as reststrahlen longer wavelengths, the mirror being positioned to receive radiation from the scanning means and to reflect its reststrahlen onto the detector.

2. A horizon sensor according to claim 1 in which the reststrahlen mirror is formed of lithium fluoride.

3. A horizon sensor according to claim 1 in which the scanning optics are catoptric.

4. A horizon sensor according to claim 2 in which the scanning means are catoptric.

5. A horizon sensor according to claim 1 in which the scanning means are conical scanning means.

6. A horizon sensor according to claim 5 in which the reststrahlen mirror is composed of lithium fluoride.

7. A horizon sensor according to claim 5 in which the scanning means are catoptric.

8. A horizon sensor according to claim 6 in which the scanning means are catoptric.

References Cited by the Examiner

UNITED STATES PATENTS

| | | | |
|---|---|---|---|
| 2,903,592 | 9/59 | Bolay | 250—86 X |
| 3,038,077 | 6/62 | Gillespie et al. | 250—83.3 |
| 3,038,996 | 6/62 | Grube | 250—83.3 |

OTHER REFERENCES

Concepts of Classical Optics, by John Strong, pub. by W. H. Freeman and Co., copyright 1958, pp. 589–596.

RALPH G. NILSON, *Primary Examiner.*

ARCHIE R. BORCHELT, *Examiner.*